Oct. 14, 1969  TEIZO ONO  3,472,111
ANCHOR BOLT
Filed Feb. 9, 1967
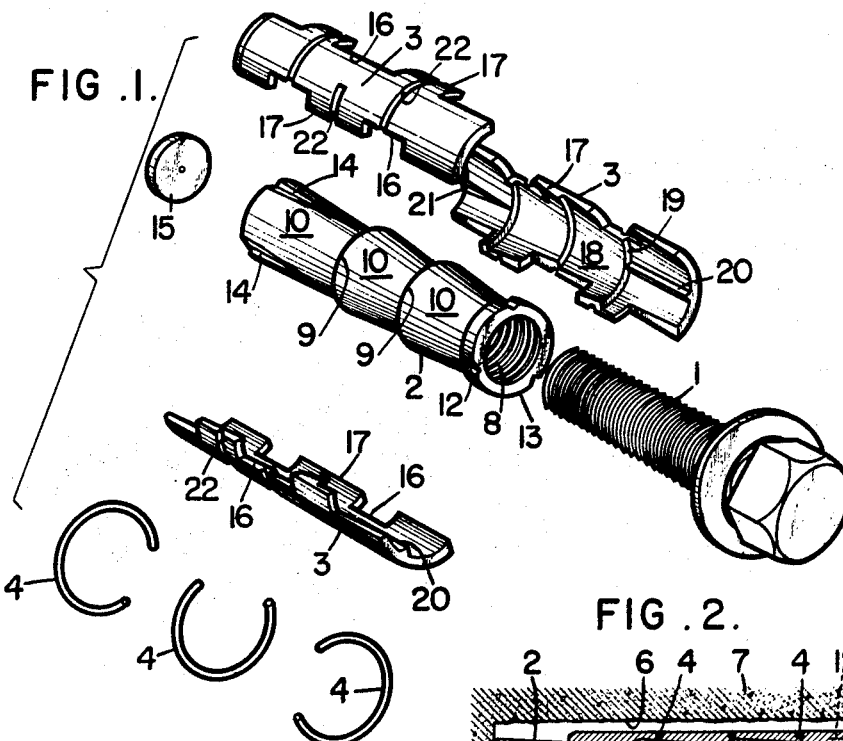
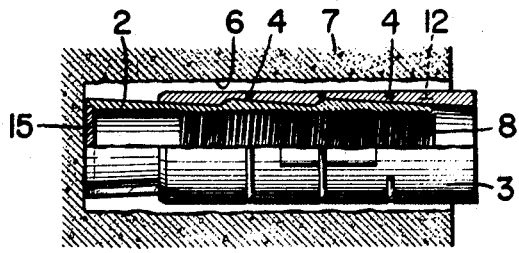
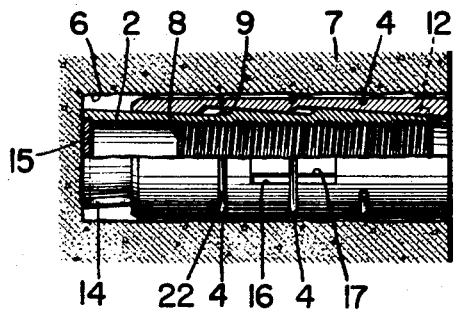
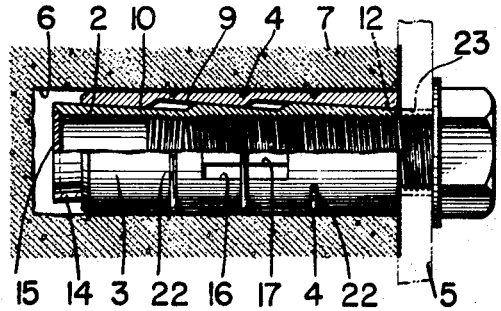

United States Patent Office 3,472,111
Patented Oct. 14, 1969

3,472,111
ANCHOR BOLT
Teizo Ono, 32 4-chome Itachibori, Nishiku,
Osaka, Japan
Filed Feb. 9, 1967, Ser. No. 614,919
Claims priority, application Japan, Feb. 23, 1966,
41/10,949
Int. Cl. F16b 13/12, 13/06
U.S. Cl. 85—74                    2 Claims

ABSTRACT OF THE DISCLOSURE

An anchor composed of an assembly of an internally threaded tube and a plurality of expansible curved plates mounted in encircling relation on the tube and held thereon by elastic rings engaged in grooves in the external surfaces of the plates. The tube and plates have mating surfaces of successive, equal, conical stepped formation so as to provide expansion of the plates when a bolt is threadably advanced in the tube.

This invention relates to an anchor bolt and more particularly to an improvement over the bolt in U.S. Patent No. 3,283,640 to the present applicant.

In the aforesaid patent the bolt is held in the hole of a concrete structure by screwing the bolt into an anchor and expanding expansible rings of the anchor outwardly within the hole thereby to fix the anchor securely within the inside surface of the hole. Since the anchor bolt provided by the aforesaid patent comprises combining a plurality of expansible rings each having inside and outside inclined surfaces and protrusions, it has the disadvantage that not all the expansible rings expand evenly and that, as a consequence, those rings which come into contact with the inside surface of the concrete at the hole sooner than the others are held firmly by the inside surface of the hole and screwing of the bolt inside the rings does not advance the expansible rings and accordingly the anchor cannot be supported firmly inside the hole. Furthermore, since the patent supra requires the use of at least six kinds of parts, it has another disadvantage that it increases the cost of manufacture. The present invention represents an improvement over the patent in that it has eliminated the disadvantage of the kind described.

An object of this invention is to provide an anchor bolt by which the anchor can be held securely and firmly within the hole by the use of expansible plates and by the minimum use of parts.

Another object of the invention is to provide an anchor bolt which is constructed by combining a plurality of expansible plates by use of spring rings in such a manner that unscrewing the bolt engaged with a threaded tube reduces the diameter of the expansible plates thereby making it easy to pull the anchor from the hole in the concrete structure for reuse.

This invention will be more fully understood from the following detailed description given with reference to the appended drawings in which:

FIG. 1 is an exploded view of an anchor bolt according to this invention;

FIG. 2 is a side view of expansible plates and a threaded tube combined with each other and inserted into a hole and partly broken away;

FIG. 3 is a side view partly broken away showing the expansible plates alone inserted into the hole by hammering the expansible plates in a state of the anchor bolt shown in FIG. 2; and FIG. 4 is a side view partly broken away showing the expansible plates fully expanded outwardly by screwing the bolt into the threaded tube in a state of the expansible plates shown in FIG. 3.

Referring now to the drawings, the anchor bolt provided by this invention basically comprises a bolt 1 and a combination of three parts constituted by an internally threaded tube 2, expansible plates 3 and spring rings 4.

The bolt 1 is of an ordinary type, its length depending upon the sum total of the thickness of a support plate 5 and being shorter than the depth of a hole 6 which is drilled in a concrete structure 7. The threaded tube 2 has a threaded portion 8 formed internally thereon for engaging the bolt 1, and tube 2 has protrusions 9 formed on the outer periphery thereof which protrusions 9 have several steps of inclined surface 10 having an upgrade inclination from the front to the rear portion of the tube 2. Said tube 2 is provided at the front end of the surface thereof with a flange 13 having an axial groove 12 on the periphery thereof and at the rear end of the inclined surface thereof with a slender axial groove 14. The number and position of said grooves 12 and 14 depend upon the number and position of slender protrusions 20 and 21 of the expansible plates 3 to be presently described. On the outermost end of the tube 2 is fixed a thin plug 15 to prevent any fine powders of concrete from entering the tube 2. The expansible plates 3 cover the entire periphery of the tube 2. The embodiment shown in FIG. 1 is illustrative of a case in which three plates 3 are used. As the case may be, four plates 3 may be used. The plates are made of lead and adapted to contact closely with the outer periphery of the tube 2, and accordingly they each are curved into an arcuate form and are slightly shorter in length than the tube 2. At two places on one side of each of the plates 3 is formed a rectangular cavity 16 and likewise at two places on the other side thereof is formed a rectangular protrusion 17 engaging firmly with said cavity 16. Accordingly, enclosing the tube 2 with three plates can fit the rectangular protrusions of one plate into the rectangular cavities of the other plate. Each of the plates 3 is provided on the internal surface thereof with inclined surfaces 18 and protrusions 19 having the same shape as and which fit well the corresponding elements 10 and 9 of the tube. Each of the expansible plates is provided on the inner surface thereof with slender protrusions 20 and 21 which fit securely into said grooves 12 and 14, and with circular grooves 22 on the outer periphery into which the spring rings 4 fit. The grooves 22 extend in a plane perpendicular to the axis of the tube 2.

Next, a description will be given of operation of the anchor bolt in FIG. 2, through 4. The plates 3 are placed on the tube 2 in a slightly forward position as shown in FIG. 2, and combined in such a manner that two surfaces 10 and 18 and two protrusions 9 and 19 fit each other and two grooves 12 and 14 and the slender protrusions 20 and 21 engage with each other, respectively, and when the spring rings 4 are finally fitted into the circular grooves 22, the plates 3 and the tube 2 are combined integrally. The plates 3 thus integrally combined with the tube 2 are inserted into the hole 6 of the concrete structure 7. Said hole is bored by a drill so that the hole is slightly larger in diameter than the combination thus made. When the combined anchor is inserted into the hole, the rear end of the tube 2 contacts the bottom of the hole 6. Then the combined anchor is struck at the front end thereof by a hammer or the like until the front end lies in the same plane as the surface of the concrete structure, whereupon the plates 3 expand outwardly against the spring rings 4 into contact with the wall of the hole by the action of the inclined surfaces 10 and 18 and the protrusions 9 and 19. The contact between plates 3 and the wall of the hole is relatively weak. Next, the bolt 1 is passed through the hole 23 of a support plate 5 into the tube 2 and threadably engaged with the threaded portion 8 of the tube 2 whereby the tube 2 is pulled forward to cause the inclined surfaces 10 and 18 and the protrusions 9 and 19 to strongly expand all the plates 3 outwardly into firm contact with the inner peripheral surface of the hole 6. In this case, even if the tube 2 is caused to be rotated by the force of the rotation of the bolt 1, the expansible plates 3 are protected from distortion by the engagement of the grooves 12 and 14 with the slender protrusions 20 and 21, respectively, and accordingly when the bolt is pushed or pulled, the plates are always bodily moved back and forth in a radial direction and the anchor moves smoothly with little danger of its getting out of order.

As described, this invention makes it possible to bring the plates 3 into contact not linearly but with the entire inner curved peripheral surface of the hole, so that the bearing surface becomes large and hence resistance becomes strong. Because the inclined surfaces and the protrusions of the tube and expansible plates fit into each other and also the rectangular protrusions into the rectangular cavities, the plates 3 do not incline with respect to the tube 2 but expand in a radial direction. The invention further makes it possible for the anchor bolt to be reused in such a manner that, when the bolt is rotated in a counterclockwise direction so as not to make the bolt push into the anchor by the rotation, the plates 3, because they are always pressed by the spring ring 4 in a radial direction i.e. inwardly, are separated from the wall of the hole to produce a space between the plates 3 and the wall of the hole 6, thereby making the plates 3 loose enough to allow pulling the anchor assembly out of the hole for reuse. Since the anchor bolt of the invention is constructed in the manner described, it has a large area of contact of the plates 3 with the inner peripheral surface of the hole of the concrete structure which increases the frictional resistance, with the result that it is firmly supported in the hole. Furthermore, once the anchor bolt of a conventional type has been fixed in the hole, it cannot be removed, whereas the anchor bolt of the invention can be removed with ease in such a manner that it may be reused.

What is claimed is:

1. An anchor adapted for being secured in a hole in a structure, said anchor comprising a threaded bolt, a tube having an internal thread which can be threadably engaged with said bolt, said tube having an outer periphery constituted by a succesion of equal stepped conical surfaces each of which increases in diameter in the direction in which the bolt is threadably advanced in the tube, a plurality of expansible plates of part annular form cooperatively encircling the tube, said expansible plates having internal inclined surfaces corresponding to the external surfaces of said tube and in contact therewith, a flange on said tube at the end thereof where the bolt is inserted, said plates having opposite ends with internal axial protrusions at said ends, said flange and tube having grooves, corresponding to said protrusions, which are engaged thereby and prevent relative rotation between the tube and plates while permitting relative axial movement therebetween, said plates having a smooth external surface with grooves therein which are algined and define continuous annular grooves, adjacent expansible plates having axial surfaces in facing relation with successive rectangular protrusions and cavities in interengaged relation, and elastic rings engaged in said annular grooves to hold the plates on said tube in assembled relation such that when the bolt is threadably advanced in the tube after the assembly of tube and plates has been inserted into a hole in a structure and the plates have been lightly engaged with the wall of the structure at said hole, the tube will be axially displaced relative to the plates which will produce radially outwards movement of the plates against the action of said rings and cause the plates to become forcibly engaged with the wall of the structure.

2. An anchor as claimed in claim 1 wherein said plates are constituted of lead.

References Cited
UNITED STATES PATENTS

| | | | |
|---|---|---|---|
| 831,464 | 9/1906 | O'Leary | 85—76 |
| 741,983 | 10/1903 | Steward | 85—88 |
| 950,492 | 3/1910 | Pleister | 85—88 |
| 1,033,447 | 7/1912 | Mower | 85—74 |
| 1,053,682 | 2/1913 | Van Antwerp | 85—74 |
| 1,349,437 | 8/1920 | Royer | 85—67 |
| 1,603,292 | 10/1926 | Peirce | 85—75 |
| 2,241,343 | 5/1941 | Fleaca | 85—74 |
| 2,525,198 | 10/1950 | Beijl | 85—69 |

MARION PARSONS, Jr., Primary Examiner

U.S. Cl. X.R.

85—79, 87, 75